United States Patent [19]

Lewis

[11] 3,756,618
[45] Sept. 4, 1973

[54] TOW HITCH
[75] Inventor: Jesse M. Lewis, Tulsa, Okla.
[73] Assignee: Thermo-Chem Corporation, Tulsa, Okla.
[22] Filed: Dec. 30, 1971
[21] Appl. No.: 213,985

[52] U.S. Cl............ 280/489, 280/406 A, 280/446 B
[51] Int. Cl............................................ B62d 53/00
[58] Field of Search................ 280/406 A, 484, 489, 280/446

[56] References Cited
UNITED STATES PATENTS
3,347,562  10/1967  Bolyard........................... 280/406 A
3,331,618   7/1967  Head............................... 280/406 A
3,284,098  11/1966  Worley............................ 280/406 A FOREIGN PATENTS OR APPLICATIONS
226,061  6/1958  Australia......................... 280/406 A Primary Examiner—Leo Friaglia
Attorney—William S. Dorman

[57] ABSTRACT

A tow hitch for vehicles pulling trailers whereby the tow hitch is of rigid construction and is secured to the towing vehicle hitch member with one degree of freedom, that being in the horizontal plane thereby allowing free rotation between said vehicle and the trailer during a turn maneuver. The tow hitch comprises dual lever arms with torsion bars journalled therein, said lever arms and torsion bars secured to the trailer frame members through a yieldable piston means. The tow hitch is particularly designed and constructed for greatly reducing relative longitudinal "porpoising" and lateral swaying between the towing vehicle and the trailer, thus providing a high degree of stability during towing operations.

7 Claims, 3 Drawing Figures

JESSE M. LEWIS
INVENTOR

BY *William S. Dorman*
ATTORNEY

JESSE M. LEWIS
INVENTOR.

BY
William S. Dorman
ATTORNEY

TOW HITCH

This invention relates to improvements in tow hitches for vehicles pulling trailers and more particularly, but not by way of limitation, to a tow hitch of dual lever arm construction in a V-shaped configuration particularly designed and constructed for dampening relative longitudinal and lateral movements between the towing vehicle and the trailer.

Trailer tow hitches normally are comprised of a tow hitch member which is rigidly secured to the towing vehicle frame, in effect becoming an extension of the vehicle frame and a ball member portion of the tow hitch for securing a trailer hitch member thereto. Similarly, the trailer hitch member normally is rigidly connected to the frame of the towed trailer and is in effect an extension of the trailer frame. The trailer hitch member generally includes a socket member engageable with the towing vehile ball member thereby allowing universal axial movement between the towing vehicle and the trailer while maintaining a secure connection therebetween. This relatively free universal axial movement which is necessary for satisfactory towing operations has some inherently dangerous disadvantages. The normal forward movement of the towing vehicle and the trailer along the highway results in a longitudinal "porpoising" effect between the vehicle and the trailer which can be very dangerous if carried to extreme limits. In addition, there is often a lateral rocking or swaying of the towing vehicle and the trailer relative to each other which, if a resonant condition is reached, can cause complete loss of control of the towing vehicle.

The present invention contemplates a novel tow hitch for vehicles pulling trailers particularly designed and constructed for overcoming the above disadvantages. The dual rearwardly extending longitudinal lever arms of the tow hitch are connected to the trailer frame members through yieldable shock absorbing means, such as by hydraulic cylinders or the like, but not limited thereto, for dampening both longitudinal and transverse or lateral relative movement between the trailer and the vehicle. When working in unison, in compression and alternately in tension, the shock absorbing means greatly reduces longitudinal "porpoising" between the vehicle and the trailer, and when working oppositely in compression and tension greatly dampens lateral oscillatory motion between the vehicle and tailer. In addition, the tow hitch is particularly designed and constructed whereby a single configuration and size may be provided for substantially all trailer hitch configurations andmay be easily modified to be adjusted for use with a non-standard trailer configuration.

It is an important object of this invention to provide a tow hitch for vehicles pulling trailers of simple construction whereby one configuration may be used for substantially all trailer hitch configurations.

It is another object of this invention to provide a tow hitch for vehicles pulling trailers whereby the longitudinal "porpoising" effect between the towing vehicle and the trailer is greatly reduced.

It is still another object of this invention to provide a tow hitch for vehicles pulling trailers whereby lateral oscillatory motion or swaying between the towing vehicles and the trailer is greatly reduced.

It is still another object of this invention to provide a novel tow hitch for vehicles pulling trailers which is simple and efficient in operation and economical and durable in construction.

Other and further objects and advantageous features of the present invention will hereinafter more fully appear in connection with a detailed description of the drawings in which.

Figure 1:
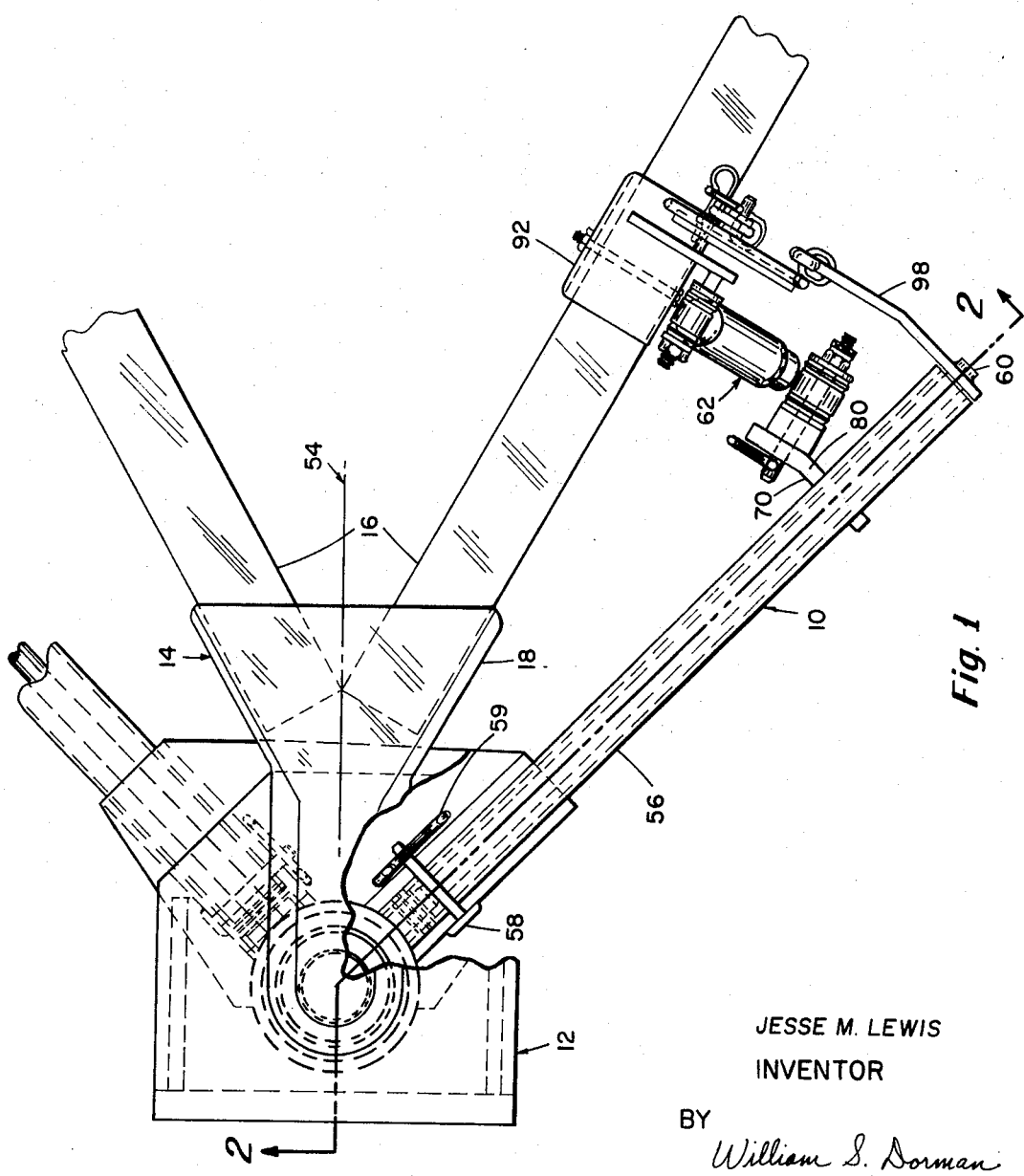
FIG. 1 is a plan view of a tow hitch for vehicles pulling trailers embodying the invention, with portions eliminated for purposes of illustration.

Referring to the drawings in detail, reference character 10 generally indicates a tow hitch assembly for a towing vehicle (not shown) pulling a trailer (not shown). The tow hitch assembly 10 comprises a tow hitch member generally indicated by reference character 12 normally carried by the tow vehicle and adapted for connection with a trailer hitch member generally indicated by reference character 14 normally provided on the trailer. The trailer hitch member 14 as shown herein comprises a V-shaped member 16 with the apex thereof extending in a direction toward the tow vehicle and a connector member 18 rigidly secured thereto. The free end of the connector member 18 is provided with a socket member 20. As is clearly apparent, the trailer hitch member 14 is in essence, a rigid extension of a basic trailer frame (not shown). However, it is to be understood that the trailer hitch member may be of substantially any standard trailer hitch configuration and is not limited to that depicted herein.

Figure 2:
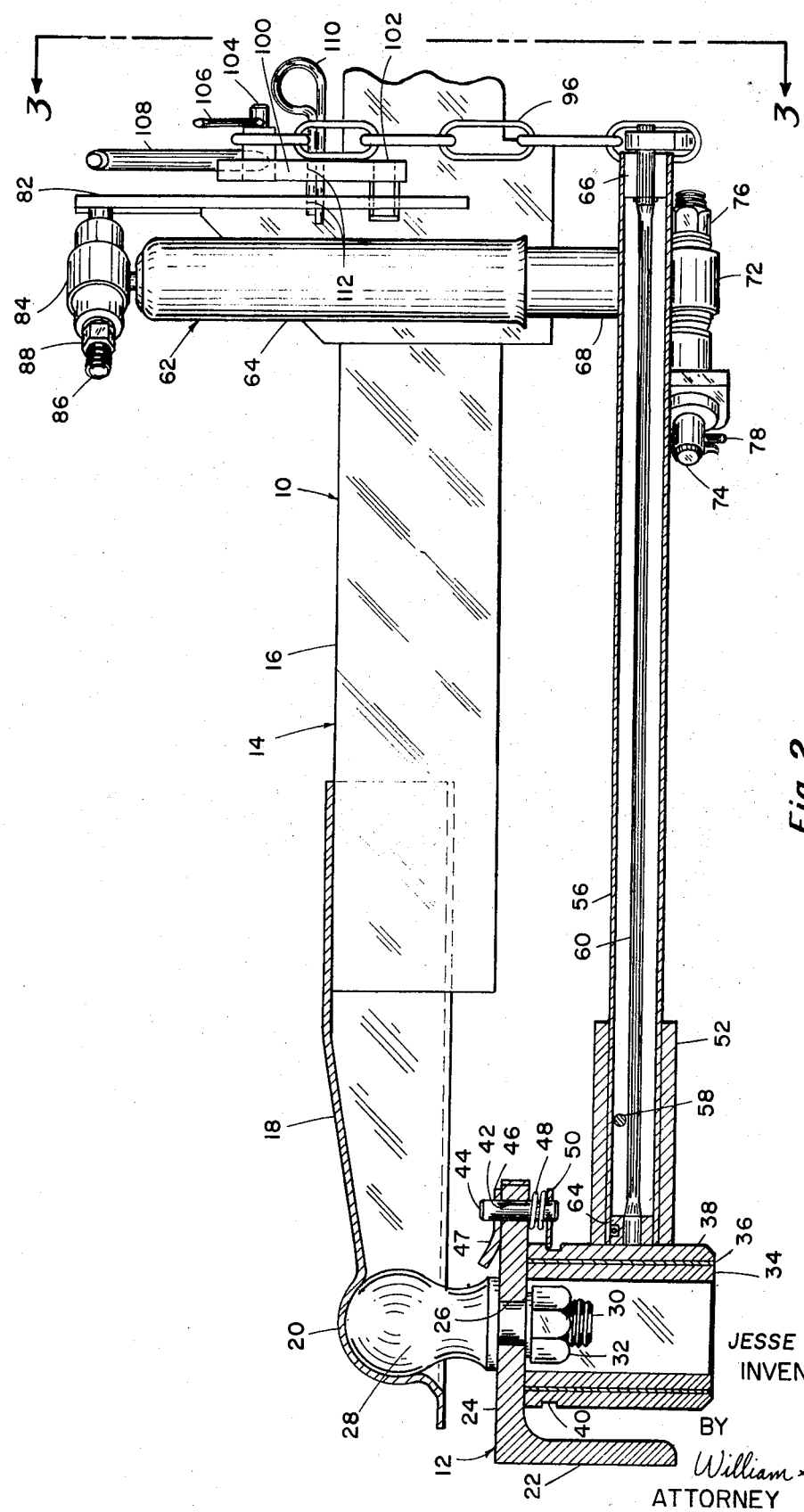
FIG. 2 is a sectional elevational view taken along line 1—1 of FIG. 1.

Referring particularly to FIG. 2, the tow hitch member 12 may be of any suitable type and as shown herein comprises a frame attach member 22 which is rigidly secured to the towing vehicle frame in any well known manner (not shown). The frame attach member 22 may be constructed of a single unit angle iron having a horizontal component 24 provided with a substantially centrally disposed vertical bore 26. The hitch member 12 also includes a ball member 28 of a compatible size with that of trailer hitch socket member 20, said ball member having a centrally disposed threaded stud 30, extending downwardly through the bore 26 of the horizontal component 24 and secured thereto by a threaded nut 32. An inner cylindrical sleeve 34 is rigidly connected to the underside of the component 24 and is disposed with the vertical longitudinal centerline thereof coinciding with the centerline of the bore 26. The inner cylindrical sleeve 34 is provided with a cylindrical bushing 36 secured to the outer periphery thereof in any well known manner (not shown).

An outer cylindrical sleeve 38, of approximately the same length as the inner sleeve 34, is slidably disposed about the periphery of the bushing 36 and is provided with an annular groove 40 around the upper portion thereof.

The horizontal component 24 of the frame attach member 22 is provided with one or more small vertical bores 42 spaced outwardly from the vertical centerline of the bore 26 at a greater distance than the outer radius of the outer vertical sleeve 38 for receiving a support pin 44 therethrough. The upper portion of the pin 44 is provided with a retaining member 46 rigidly secured thereto for prohibiting downward travel of the pin 44. The retaining member 46 is provided with a handle means 47 rigidly secured thereto for rotation of the support pin 44. A retaining cam 50 is rigidly connected to the lower end of the support pin 44 and rotatably engageable with the annular groove 40. The outer periphery of the retaining cam 50 is provided with a recess portion whereby upon rotation thereof into a position such that the recess portion is adjacent to the outer cylindrical sleeve 38, said cam 50 will not engage the annular groove 40 and the sleeve 38 may be removed from the tow hitch member 12. A helical compression spring 48 is disposed around the lower portion of the pin 44 and exerts a vertical force between the lower face of the component 24 and the retaining cam 50 keeping the pin 44 in a downward position whenever the retaining cam 50 is not engaged with the annular groove 40. It is obvious that when the pin 44 is in place with the retaining cam 50 attached thereto and engaged with the groove 40, the outer cylindrical sleeve 38 is vertically secured to the tow hitch member 12 and is free to rotate in a horizontal plane about an axis which is generally described by the centerline of the vertical bore 26.

Two horizontally disposed longitudinal mounting sleeves 52 of any suitable cross sectional shape are rigidly connected to the outer periphery of the outer cylindrical sleeve 38. The mounting sleeves 52 extend radially outward from the sleeve 38 in a horizontal plane for purposes that will be hereinafter set forth. Two longitudinally extending lever arm sleeves 56 with outer cross sectional shape complementary to that of the inner cross sectional shape of the mounting sleeves 52 are inserted within each of said mounting sleeves 52 and rigidly attached thereto in any well known manner as generally indicated by a retaining pin 58 which is transversely disposed through both the mounting sleeve 52 and the respective lever arm sleeve 56, said pin 58 being secured in position by a suitable cotter pin 59 or the like. A longitudinally extending torsion bar 62 is disposed within each lever arm sleeve 56 and extends longitudinally therethrough. The inner end of the bar 62 is rigidly secured within the sleeve 56 in any well known manner, as indicated by the mounting sleeve 64. The outer extremity of each torsion bar 60 is rotatably supported within the lever arm sleeve 56 by a suitable sleeve bearing 66. The outer extremities of each lever arm sleeve 56 and the associated torsion bar 60 are connected to the trailer hitch frame member 16 through a yieldable means generally described by reference character 62. The yieldable means 62 comprises a shock housing 64 and shock piston member 68 reciprocally disposed therein. The lower extremity of each piston member 68 is rotatably connected to the sleeve 56 in the proximity of the outer end thereof by means of a lower shock mount 70. Rotation of the piston 68 is effected by a sleeve member 72 rigidly secured to the piston member 68 and a lower shock mount pin 74 which is rigidly secured to the lower shock mount 70 and journalled within the sleeve member 72. The sleeve member 72 is secured to the pin 74 in any well known manner as generally indicated by the nut 76 and the cotter pin 78. The shock mount 70 may be constructed of an iron plate bent or formed with an angle 80 therein suitable to align the axis of rotation of the lower extremity of the piston member 68 to be substantially parallel with the trailer hitch frame member 16.

Figure 3:
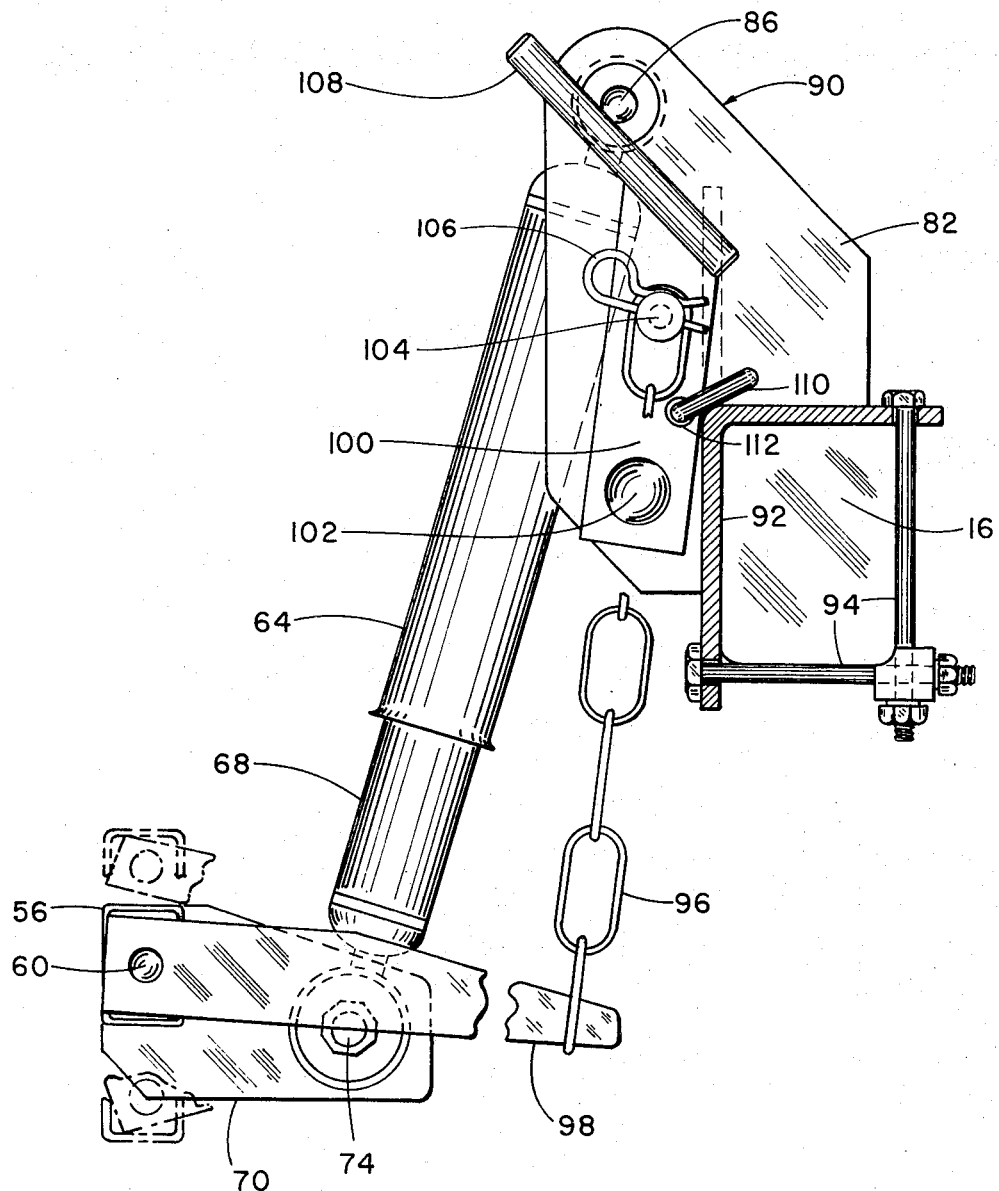
FIG. 3 is a veiw taken on line 3—3 of FIG. 2.

A trailer attach member 90 (FIG. 3) comprising an upper shock mount plate 82 which is rigidly secured to a trailer frame attach angle 92 which is rigidly secured to the trailer hitch frame member 16 by any well known manner such as by a plurality of threaded bolts and nuts as generally indicated by reference character 94. The upper extremity of the shock housing 64 is rotatably connected to the upper shock mount plate 82 in a manner wherein therotation thereof is parallel to that of the lower shock mount pin 74. The rotation of the housing 64 is effected by a sleeve member 84 rigidly connected to the shock housing 64 and an upper shock mount plate 82 and journalled within the sleeve member 84. The pin 86 is secured to the outer extremity of the sleeve 84 by any suitable means such as by the threaded nut 88.

A torsion bar lever arm 98 is provided for each torsion bar 60 and one end of each arm 98 is rigidly secured to the outer extremity of the respective torsion bar 60 and perpendicular thereto such that the opposite end of said lever arm 98 is disposed substantially downward when the respective torsion bar 60 is in a relaxed state. The outer end of each lever arm 98 is provided with a suitable means for attachment of a flexible link 96 thereto. The flexible link 96 of each arm 98 is connected at one end thereof to the trailer attach member 90 by a suitable hanger mount means 100. The hanger mount means 100 may be constructed of a flat rectangular plate of which one end is rotatably secured to the upper shock mount plate 82 by a stud bearing combination 102. The plate 82 is provided with a hanger pin 104 rigidly secured thereto for attaching the opposite end of the chain 96, said chain 96 being secured to the hanger pin 104 by a cotter pin 106. The hanger means 100 is provided with a handle 108 which is rigidly secured to the upper end thereof to facilitate manual rotation of the hanger mount means 100 into an upright position thereby raising the lever arm 98 to a substantially horizontal position which will "torque up" or put a twisting tension in the torsion bar 60. The hanger mount means 100 may be fixed in an upright position during the towing operations by insertion of a suitable pin 110 into alignment bores 112, said bores 112 being disposed in the hanger mount means 100 and the upper shock mount plate 82.

In use, the tow hitch 10, complete with lever arm sleeves 56 and the shock absorbing means 62, may be rigidly affixed in any well known manner to the rear framework of the towing vehicle (not shown) through the frame attach member 22 of the tow hitch member 12. The trailer hitch socket member 20 may then be secured by any well known means to the ball member 28 of the tow hitch member 12. The outer extremities of the lever arm sleeves 56 are then attached to the trailer hitch frame members 16 through the shock absorbing means 62, by means of the upper shock attach angle 92. The chain hanger mounts 100 may be initially rotated about the stud bearings 102 in one direction during the trailer connection operation thereby removing tension from the chains 96 and the torsion bars 60. When the tow hitch has been properly secured as hereinabove set forth, the hanger mounts 100 may be rotated in a reverse direction by use of the handle 108 and secured to the upper shock mount plate 82 by the pin means 110, thereby lifting the torsion bar lever arm 98 into a substantially horizontal working position, whereby the torsion bars 60 are "torqued up" or in twisting tension.

It is readily apparent from the above description that the lever arm sleeves 56 in effect become rotatable extensions of the towing vehicle frame whose rotational freedom is only in the horizontal plane as described by the said vehicle frame, and whose vertical rotational axis coincides with the vertical rotational axis of the vehicle with the trailer at the tow hitch ball means 28, thus allowing free horizontal rotation between the vehicle and the trailer during turning maneuvers. It is also apparent that the dual lever arm sleeves 56 with attaching shock absorbing means 62 are attached to each side of the trailer hitch frame member 16 at a lateral distance from the centerline of the trailer as generally depicted by reference character 54 to provide a substantially long lateral moment arm from the centerline 54. This moment arm will allow the shock absorbers 62 to greatly dampen any non-unison lateral oscillatory motion or rocking between the towing vehicle (as transmitted along the lever arm sleeves 56) and the trailer (transmitted through the trailer hitch frame members 16) about the centerline 54 of the trailer. It should also be noted that the "torqued up" torsion bars 60 will act as springs which will yieldably resist any motion to longitudinally extend the shock absorber means 62 and in the limit will prevent said shock absorbers 62 from overextending beyond a distance represented by the combined lengths of the lever arm 98 and the chain 96.

It is also obvious that the radial disposition of the dual lever arm sleeves 56 with the associated shock absorbers 62 toward the trailer will likewise provide a longitudinal moment arm between the ball member 28 and the outer attach points for the lever arm sleeves 56. This moment arm will allow the shock absorbers 62 and the torsion bars 60 acting in unison to greatly reduce or eliminate any longitudinal "porpoising" effect between the vehicle and the trailer created by rotation of the vehicle and the trailer about a horizontal lateral axis passing through the ball member 28.

From the foregoing it will be readily apparent that the present invention provides a tow hitch for vehicles pulling trailers which is particularly designed and constructed for substantially eliminating the dangerous "porpoising" effect and to greatly reduce lateral swaying between the towing vehicle and the trailer while allowing free horizontal rotation therebetween during turn maneuvers. The novel tow hitch is simple and efficient in operation and economical and durable in construction.

Whereas the present invention has been described in particular relation to the drawings attached hereto, it should be understood that other and further modifications, apart from those shown or suggested herein, may be made within the spirit and scope of this invention.

What is claimed is:

1. A tow hitch for vehicles pulling trailers comprising a hitch member secured to the vehicle, universal pivot connection means secured to the hitch member, divergent lever reaction arm means rotatably secured to the hitch member for rotation in a horizontal plane and extending rearwardly from said hitch member, trailer attach means secured to the trailer, yieldable means interposed between the trailer attach means and the lever reaction arm means for providing both longitudinal and lateral stability between vehicle and trailer during towing operations while allowing free horizontal rotation between the vehicle and trailer during turn maneuvers, said yieldable means comprises a hydraulic cylinder interposed between the trailer attach means and the lever reaction arm means, said hydraulic cylinder comprising a piston member having one end rotatably connected to the lever reaction arm means, a piston housing member having one end rotatably connected to the trailer attach means for receiving the piston member therein.

2. A tow hitch for vehicles pulling trailers comprising a hitch member secured to the vehicle; universal pivot connection means secured to the hitch member; divergent lever reaction arm means rotatably secured to the hitch member for rotation in a horizontal plane and extending rearwardly from said hitch member, said lever reaction arm means comprises a vertically disposed cylindrical sleeve rotatably secured to the hitch member, two horizontally disposed outer mounting sleeves extending rearwardly and outwardly from said cylindrical sleeve and rigidly secured thereto, an elongated lever reaction arm sleeve member disposed within each outer mounting sleeves and rigidly secured thereto, the outer extremity of said sleeve members extending beyond the outer end of the mounting sleeves and being operably connected with a yieldable means, trailer attach means secured to the trailer, said yieldable means interposed between the trailer attach means and the lever reaction arm means for providing both longitudinal and lateral stability between vehicle and trailer during towing operations while allowing free horizontal rotation between the vehicle and trailer during turn maneuvers.

3. A tow hitch for vehicles pulling trailers as set forth in claim 2 wherein each lever reaction arm sleeve member comprises an elongated torsion bar journalled within said sleeve member, the inner extremity of the torsion bar being rigidly secured to the respective sleeve member, the outer extremity of the torsion bar being rotatably secured to the outer end of the sleeve member for rotation about the longitudinal axis thereof, a torsion bar lever arm having one end thereof rigidly secured to the outer extremity of the torsion bar and disposed perpendicularly with respect thereto, a flexible link interposed between the opposite end of said torsion bar lever arm and the trailer attach means whereby upon attachment of the tow hitch to the trailer each torsion bar may be rotated into twisting tension and attached to the trailer attach means by the flexible link, each torsion bar acting as a spring to yieldably resist and limit extension of the aformentioned yieldable means.

4. A tow hitch for vehicles pulling trailers as set forth in claim 3 wherein the yieldable means comprises a hydraulic cylinder interposed between the trailer attach means and the lever reaction arm means, said hydraulic cylinder comprising a piston member having one end rotatably connected to the lever reaction arm means, a piston housing member having one end rotatably connected to the trailer attach means for receiving the piston member therein.

5. A tow hitch for vehicles pulling trailers as set forth in claim 3 wherein the trailer attach means comprises an attach angle member for rigidly securing said attach means to the trailer, mounting plate secured to the attach angle, a flexible link hanger mount secured to the mounting plate for attachment of the flexible link connected to the torsion bar lever arm.

6. A tow hitch for vehicles pulling trailers as set forth in claim 5 wherein the flexible link hanger mount comprises an elongated flat plate having one end rotatably secured to the mounting plate, a handle secured to the opposite end of the hanger mount to facilitate rotation thereof, a hanger pin secured to the said hanger mount for attachment of the flexible link, and a hanger mount locking means for locking said hanger mount into position after rotating the torsion bar into twisting tension.

7. A tow hitch for vehicles pulling trailers as set forth in claim 6 wherein the yieldable means comprises a hydraulic cylinder interposed between the trailer attach means and the lever reaction arm means said hydraulic cylinder comprising a piston member having one end rotatably connected to the lever reaction arm means, a piston housing member having one end rotatably connected to the trailer attach means for receiving the piston member therein.

* * * * *